(12) United States Patent  (10) Patent No.: US 8,744,976 B2
Jagadish et al.  (45) Date of Patent: Jun. 3, 2014

(54) DISCOVERY OF FRIENDS USING SOCIAL NETWORK GRAPH PROPERTIES

(75) Inventors: Sunil Jagadish, Bangalore (IN); Jignashu Parikh, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1555 days.

(21) Appl. No.: 12/111,050

(22) Filed: Apr. 28, 2008

(65) Prior Publication Data

US 2009/0271370 A1  Oct. 29, 2009

(51) Int. Cl.
*G06Q 99/00*  (2006.01)
*G06F 17/30*  (2006.01)

(52) U.S. Cl.
USPC ............ 705/319; 707/732; 707/773; 707/798

(58) Field of Classification Search
CPC ... G06Q 50/01; G06F 17/30; G06F 17/30513; G06F 17/30958; G06F 17/30961
USPC ........................................................ 705/319
See application file for complete search history.

(56) References Cited

U.S. PATENT DOCUMENTS

| | | |
|---|---|---|
| 5,835,087 A | 11/1998 | Herz et al. |
| 5,950,193 A | 9/1999 | Kulkarni |
| 5,996,006 A | 11/1999 | Speicher |
| 6,029,141 A | 2/2000 | Bezos et al. |
| 6,064,967 A | 5/2000 | Speicher |
| 6,129,141 A | 10/2000 | Yang et al. |
| 6,175,831 B1 | 1/2001 | Weinreich et al. |
| 6,243,375 B1 | 6/2001 | Speicher |
| 6,269,369 B1 | 7/2001 | Robertson |
| 6,282,515 B1 | 8/2001 | Speicher |
| 6,285,984 B1 | 9/2001 | Speicher |
| 6,296,369 B1 | 10/2001 | Liao |
| 6,327,573 B1 | 12/2001 | Walker et al. |
| 6,356,879 B2 | 3/2002 | Aggarwal et al. |
| 6,433,795 B1 | 8/2002 | MacNaughton et al. |
| 6,449,344 B1 | 9/2002 | Goldfinger et al. |
| 6,466,917 B1 | 10/2002 | Goyal et al. |
| 6,502,077 B1 | 12/2002 | Speicher |
| 6,606,657 B1 | 8/2003 | Zilberstein et al. |

(Continued)

OTHER PUBLICATIONS

Friendster Deploys Industry's First Highly Scalabale Six-Degree Social Networking Graph Server; Users Gain Powerful Control over Access to Profiles and Managing Communications. PR Newswire [New York] Jun. 21, 2007.*

(Continued)

*Primary Examiner* — Amanda Kirlin
(74) *Attorney, Agent, or Firm* — James J. DeCarlo; Greenberg Traurig, LLP

(57) ABSTRACT

Embodiments are directed towards providing a list of potential friends to a user based on an analysis of friends' contact lists. The user may provide a subset of friends within a contact list for analysis, along with a degree of separation over which to perform the analysis, and/or a minimum threshold number of occurrences for identifying a candidate friend. The subset of friends' contact lists may then be recursively traversed and merged, where common friends may be identified as members of a candidate set for suggesting friends to the user. In one embodiment, the candidate members may be retained within the candidate set if there is a commonality between the friends and the candidate that exceeds the minimum threshold. The candidate list may also be rank order using various approaches, including a weighted energy diffusion model based in part on a number of communications between the candidates.

15 Claims, 7 Drawing Sheets

(56) References Cited

U.S. PATENT DOCUMENTS

| | | | |
|---|---|---|---|
| 6,697,786 | B2 | 2/2004 | Speicher |
| 6,714,931 | B1 | 3/2004 | Papierniak et al. |
| 6,745,178 | B1 | 6/2004 | Emens et al. |
| 6,836,762 | B2 | 12/2004 | Speicher |
| 6,879,994 | B1 | 4/2005 | Matsliach et al. |
| 6,990,628 | B1 * | 1/2006 | Palmer et al. ............... 715/234 |
| 6,993,325 | B1 | 1/2006 | Waesterlid |
| 7,167,910 | B2 | 1/2007 | Farnham et al. |
| 7,512,612 | B1 * | 3/2009 | Akella et al. ............... 1/1 |
| 7,539,676 | B2 * | 5/2009 | Aravamudan et al. ............... 1/1 |
| 7,539,697 | B1 * | 5/2009 | Akella et al. ............... 1/1 |
| 7,596,597 | B2 * | 9/2009 | Liu et al. ............... 709/204 |
| 8,280,913 | B2 * | 10/2012 | Bergin ............... 707/793 |
| 2002/0023132 | A1 | 2/2002 | Tornabene et al. |
| 2002/0023230 | A1 | 2/2002 | Bolnick et al. |
| 2002/0049616 | A1 | 4/2002 | Speicher |
| 2002/0059201 | A1 | 5/2002 | Work |
| 2002/0099806 | A1 | 7/2002 | Balsamo et al. |
| 2002/0103797 | A1 | 8/2002 | Goel et al. |
| 2002/0107242 | A1 | 8/2002 | Sabb et al. |
| 2002/0116466 | A1 | 8/2002 | Trevithick et al. |
| 2002/0124053 | A1 | 9/2002 | Adams et al. |
| 2003/0050977 | A1 | 3/2003 | Puthenkulam et al. |
| 2003/0074440 | A1 | 4/2003 | Grabarnik et al. |
| 2003/0135412 | A1 | 7/2003 | Speicher |
| 2003/0158855 | A1 | 8/2003 | Farnham et al. |
| 2003/0167324 | A1 | 9/2003 | Farnham et al. |
| 2003/0231207 | A1 | 12/2003 | Huang |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0107242 | A1 | 6/2004 | Vert et al. |
| 2004/0119760 | A1 | 6/2004 | Grossman et al. |
| 2004/0122681 | A1 | 6/2004 | Ruvolo et al. |
| 2004/0122803 | A1 | 6/2004 | Dom et al. |
| 2004/0122855 | A1 | 6/2004 | Ruvolo et al. |
| 2004/0148275 | A1 | 7/2004 | Achlioptas |
| 2004/0199765 | A1 | 10/2004 | Kohane et al. |
| 2004/0215648 | A1 | 10/2004 | Marshall et al. |
| 2004/0215793 | A1 | 10/2004 | Ryan et al. |
| 2004/0260792 | A1 | 12/2004 | Speicher |
| 2005/0015455 | A1 | 1/2005 | Liu |
| 2005/0076021 | A1 | 4/2005 | Wu et al. |
| 2005/0083906 | A1 | 4/2005 | Speicher |
| 2006/0242128 | A1 | 10/2006 | Goel |
| 2006/0294085 | A1 * | 12/2006 | Rose et al. ............... 707/3 |
| 2007/0027921 | A1 | 2/2007 | Alvarado et al. |
| 2008/0103907 | A1 * | 5/2008 | Maislos et al. ............... 705/14 |
| 2008/0120129 | A1 * | 5/2008 | Seubert et al. ............... 705/1 |
| 2008/0320075 | A1 * | 12/2008 | Livshits et al. ............... 709/203 |
| 2009/0164464 | A1 * | 6/2009 | Carrico et al. ............... 707/5 |
| 2009/0265198 | A1 * | 10/2009 | Lester et al. ............... 705/7 |

OTHER PUBLICATIONS

"A Sneak Preview of the Christian Connection Matchmaker Match Page," 2 pages, http://web.archive.org/web/19990223221053 (accessed Jan. 25, 2006).
"A Sneak Preview of the Christian Connection Matchmaker Search Page," 2 pages, http://web.archive.org/web/19990508232314/www.christian.matchmaker.com/ppsearch (accessed Jan. 25, 2006).
"A Sneak Preview of the Christian Connection Matchmaker Who's on Page," 3 pages, http://web.archive.org/web/19990224012014/www.christian.matchmaker.com/ppwho (accessed Jul. 28, 2007).
"FAQs: About the ZeroDegrees Service," 35 pages, http://www.zerodegrees.com/faq.htm (accessed Sep. 8, 2004).
"Matchmaker Help Pages—Blocking Mail," 1 page, http://web.archive.org/web/19990910120622/christian.matchmaker.com/help?block (accessed Feb. 15, 2007).
"The Matchmaker Help Page," 3 pages, http://web.archive.org/web/19991004022404/christian.matchmaker.com/help (accessed Feb. 15, 2007).
"Matchmaker User Tools Page," 2 pages, http://web.archive.org/web/19990424133736/www.christian.matchmaker.com/utilities (accessed Feb. 15, 2007).
"The Matchmaker Network Systems Page," System Names and Numbers, 3 pages, http://web.archive.org/web/19990424123143/www.christian.matchmaker.com/systems (accessed Feb. 15, 2007).
"The Purpose Principles and Process," 3 pages, http://web.archive.org/web/19990224045035/www.christian.matchmaker.com/process (accessed Jan. 25, 2006).
"Welcome to the Christian Connection Matchmaker!," 1 page, http://web.archive.org/web/19990221092342/www.christian.matchmaker.com/main (accessed Jan. 25, 2006).
"Welcome to the Christian Connection Matchmaker," 2 pages, http://web.archive.org/web/19990222170152/http://www.christian.email.net/index.html (accessed Jan. 25, 2006).
"Yahoo! Groups: Getting Started, Groups Account, Groups Features, Groups Questions," 1 page (accessed Jan. 26, 2006).
"Yahoo! Groups: What is a Group?," 1 page, http://web.archive.org/web/20021103223155/www.yahoo.com/r/ub (accessed Jan. 26, 2006).
"Yahoo! Groups: What is the spam policy in Yahoo! Groups? How do I avoid spam?", http://web.archive.org/web/20021024130230/help.yahoo.com/help/us/groups/groups-05.html (accessed Jan. 26, 2006).
Ceglowski, Maciej et al., "Semantic Search of Unstructured Data Using Contextual Network Graphs," Jun. 2003, 11 pages http://citeseer.ist.psu.edu/cache/papers/cs/33114/http:zSzzSzjavelina.cet.middlebury.eduzSzcnszSzContextual_Network_Graphs.pdf/ceglowski03semantic.pdf.
Cranor, Lorrie Faith et al., "Spam," Communications of the ACM, Aug. 1998, 41(8):74-83 (8 pages).
Dragan, Richard V., "Tribe.net (beta)," PC Magazine, Jan. 20, 2004, 5 pages, http://www.pcmag.com/article2/0,1759,1418688,00.asp (accessed Sep. 8, 2004).
Ethier, Jason, "Current Research in Social Network Theory," 10 pages, http://upaya.soc.neu.edu/archive/students/Ethier-SocialNetworks.html (accessed Apr. 18, 2004).
"Welcome to My Yahoo!", 2 pages, http://web.archive.org/web/20021105133520/www.yahoo.com/r/i1 (accessed Feb. 15, 2007).
Hines, Matt, "America Online Proposes Love.com," Dec. 10, 2003 http://news.com.com/2100-1032-5118986.html (accessed Jan. 10, 2005).
Hines, Matt, "AOL Serves Up Software for BREW," Dec. 9, 2003, http://news.com.com/2100-1038-5117686.html (accessed Jan. 10, 2005).
Jordan, Ken et al., "The Augmented Social Network: Building Identity and Trust Into the Next-Generation Internet," First Monday: Peer-Reviewed Journal on the Internet, Aug. 2003, vol. 8, No. 8, 62 pages, http://www.firstmonday.dk/issues/issue8_8/jordan/ (accessed Mar. 11, 2004).
"MatchMaker Help Pages—Frequently Asked Questions," 7 pages, http://web.archive.org/web/19990910160008/christian.matchmaker.com/help?faqs (accessed Feb. 15, 2007).
"Matchmaker.com Disclaimer," 4 pages, http://web.archive.org/web/20000420114350/www.christian.matchmaker.com/rules (accessed Jan. 25, 2006).
"Member Site Selection Page," 2 pages, http://web.archive.org/web/19990219183131/matchmaker.com/newtry.shtml (accessed Jan. 25, 2006).
Merrick, Amy, "The Best Way to . . . Find a Date—OK, So True Love Isn't Guaranteed; But There Are Ways to Better the Odds," Wall Street Journal, New York, NY, Nov. 27, 2000, ProQuest ID 64669169, 5 pages, http://proquest.umi.com/pqdweb?did=64669169&sid=1&Fmt=3&clientId=19649&RQT=309&VName=PQD (accessed Jan. 26, 2006).
Mullaney, Timothy J., "Diller's Latest Little Bet on the Net," BusinessWeek Online, Mar. 1, 2004, 2 pages, http://www.businessweek.com:/print/technology/content/mar2004/tc20004031_2820_tc119.h . . . (accessed Apr. 7, 2004).
U.S. Appl. No. 10/946,636, Official Communication mailed Dec. 13, 2007.
U.S. Appl. No. 10/866,954, Official Communication mailed Jan. 8, 2008.

(56) References Cited

OTHER PUBLICATIONS

U.S. Appl. No. 10/832,172, Official Communication mailed Feb. 9, 2007.
U.S. Appl. No. 10/832,172, Official Communication mailed May 16, 2007.
U.S. Appl. No. 10/832,172, Official Communication mailed Aug. 23, 2006.
U.S. Appl. No. 10/863,926, Official Communication mailed Feb. 28, 2006.
U.S. Appl. No. 10/863,926, Official Communication mailed Apr. 6, 2005.
U.S. Appl. No. 10/863,926, Official Communication mailed Jun. 26, 2007.
U.S. Appl. No. 10/863,926, Official Communication mailed Aug. 14, 2006.
U.S. Appl. No. 10/863,926, Official Communication mailed Sep. 9, 2005.
U.S. Appl. No. 10/863,926, Official Communication mailed Dec. 29, 2006.
U.S. Appl. No. 10/866,954, Official Communication mailed Feb. 1, 2006.
U.S. Appl. No. 10/866,954, Official Communication mailed Feb. 23, 2007.
U.S. Appl. No. 10/866,954, Official Communication mailed Mar. 16, 2005.
U.S. Appl. No. 10/866,954, Official Communication mailed Jul. 26, 2006.
U.S. Appl. No. 10/866,954, Official Communication mailed Aug. 8, 2007.
U.S. Appl. No. 10/946,630, Official Communication mailed Feb. 6, 2007.
U.S. Appl. No. 10/946,630, Official Communication mailed May 2, 2007.
U.S. Appl. No. 10/946,630, Official Communication mailed Jul. 27, 2007.
U.S. Appl. No. 10/946,630, Official Communication mailed Aug. 16, 2006.
U.S. Appl. No. 10/946,636, Official Communication mailed Feb. 21, 2007.
U.S. Appl. No. 10/946,636, Official Communication mailed Jul. 27, 2007.
U.S. Appl. No. 10/946,636, Official Communication mailed Aug. 29, 2006.
U.S. Appl. No. 11/314,201, Official Communication mailed May 17, 2007.
U.S. Appl. No. 11/314,201, Official Communication mailed Nov. 1, 2007.
U.S. Appl. No. 10/863,926, Official Communication mailed Dec. 17, 2007.
International Search Report mailed Oct. 3, 2006, issued for corresponding International Application No. PCT/US04/38696.
Written Opinion mailed Oct. 3, 2006, issued for corresponding International Patent Application No. PCT/US04/38696.
International Preliminary Report on Patentability mailed Dec. 14, 2006 issued for corresponding International Patent Application No. PCT/US2004/038703.
International Search Report and Written Opinion mailed Jul. 7, 2005 issued for corresponding International Patent Application No. PCT/US04/38704.

* cited by examiner

DISCOVERY OF FRIENDS USING SOCIAL NETWORK GRAPH PROPERTIES

TECHNICAL FIELD

The present invention relates generally to communications and, more particularly, but not exclusively to performing a providing a list of potential friends based on a friends' relationship graph identifiable through their respective contact lists.

BACKGROUND

Social networking is a concept that an individual's personal network of friends, family colleagues, coworkers, and the subsequent connections within those networks, can be utilized to find more relevant connections for dating, job networking, service referrals, activity partners, and the like.

A social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first-degree relationships. First-degree relationships can have varying degrees of closeness, trust, and other characteristics. These relationships can also be unidirectional or bidirectional. A unidirectional relationship typically means that a first person is willing and able to interact with a second person, but the second person may not be willing or able to interact with the first person. Conversely, a bidirectional relationship typically means that both people are willing and able to interact with each other.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second-degree relationship.

However, in today's busy world, people often lose contact with their friends, classmates, co-workers, and the like. Finding these people again can sometimes be difficult, if not impossible. For example, a person might go to a website, type in a particular name of a lost friend, and information about the lost friend. Such 'profile' information might include where the lost friend went to school, when they went to school, where they worked, and/or the like. Providing profile information often requires, however, that the lost friend, 'subscribed' to the particular website that is to be searched and/or that the lost friend further entered such profile information about themselves. If such profile information is incomplete or absent, then searches based on profile information will likely also be incomplete or otherwise lacking.

Moreover, it may be that the person performing the search may be looking for persons based on a common activity, such as dating, a business, a club, or the like. This may be especially valid, where a person is attempting to determine whether or not to participate in a particular social network activity. As more of one's friends are associated with the particular social network activity, the more likely that the person will also participate. Thus, there is a desire to improve how persons may locate and/or identify friends and/or potential friends. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
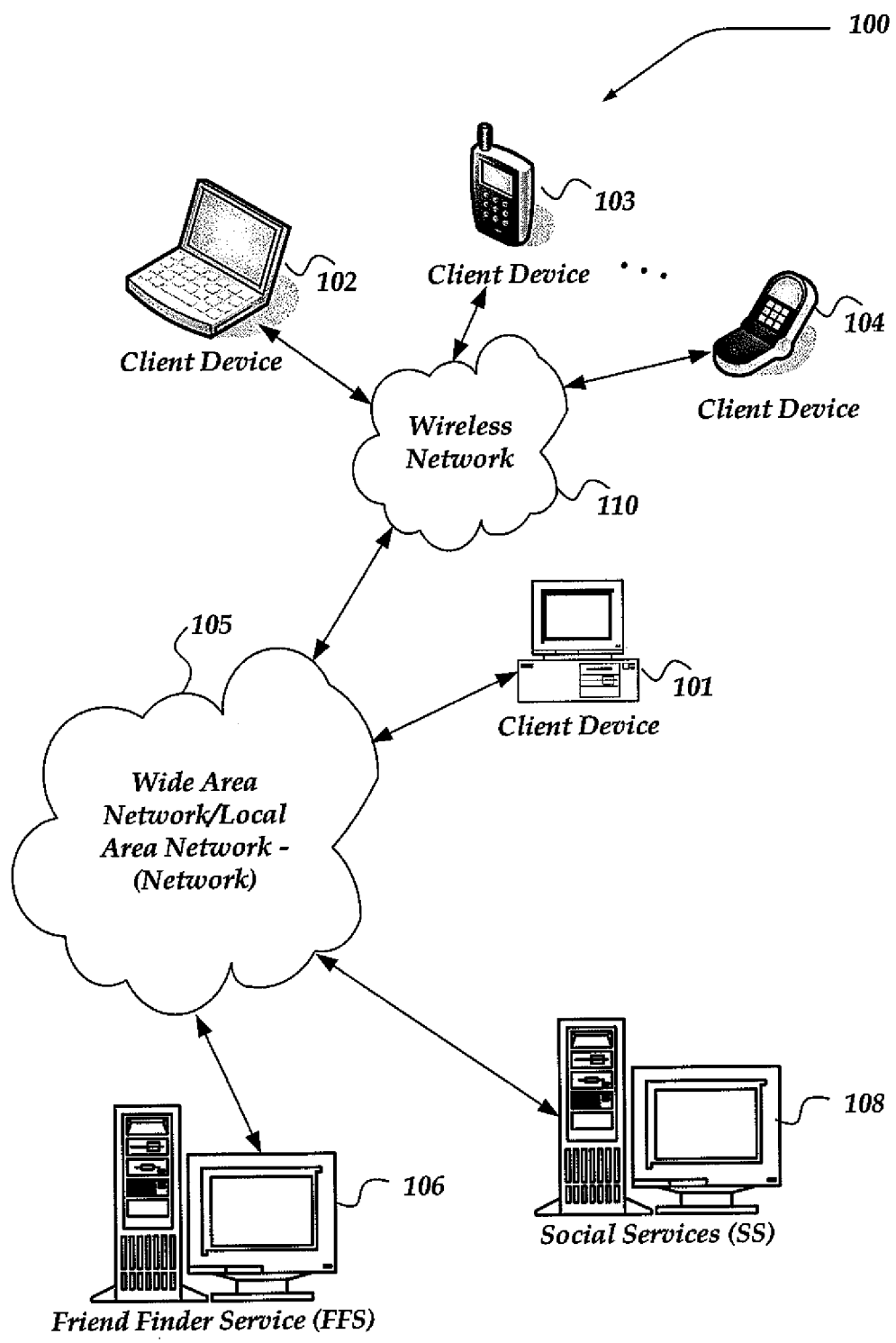
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

As used herein, the term "contact list" refers to any source of information about members in a person's list of contacts. As such a contact list includes email address books, buddy lists, text messaging address lists, and the like. A contact list typically includes a name of a contact (as used herein "a contact"), and a phone number, or other unique identifier. A contact list may also include an address, a tag indicating a relationship, a membership, or other selected information about the contact. It is important to note that while a name of a contact may reside within a contact list, it should not be inferred expressly or inherently that the name of the contact has communicated in any manner with the person with which the contact list is associated. For example, the contact list owner might have entered a name into their contact list, based on a friend's suggestion, an advertisement, or the like, but might not have communicated with that contact. However, the contact list owner might also enter a name within the contact list, and have communicated with that contact. Thus, while it is typical that a contact list includes a person's first degree of separation relationships, the contact list may also include contacts that are not currently defined within such a relationship.

As used herein, the term "profile information" refers to explicitly provided labels, tags, and other added information about a contact that indicates a characteristic about the contact beyond a name, address, or phone number, email address, or other messaging address related information. Such profile information typically provides such information as a whether the contact is a friend, family member, a classmate, batchmate, a co-worker, sports buddy, or the like. Profile information may also indicate a school association, an employer association, a religious affiliation, or the like. Profile information as stated above may also include such information as when a person went to a school, where they worked, how long they were employed at a particular location, or similar additional information about the contact's social activities. Profile information about a contact may also include information about what the contact likes and/or dislikes, hobbies, or the like, as well as physical characteristics about the contact such as height, weight, eye color, hair color, age, gender, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards providing a list of candidate friends to a user based on an analysis of friends' contact lists. In one embodiment, the user may provide a subset of friends or contacts within a contact list for analysis. In one embodiment, the user might specify a degree of separation over which to perform the analysis, and/or a minimum threshold number of occurrences for identifying a candidate friend. The subset of friends' contact lists may then be recursively traversed and merged, where common friends may be identified as members of a candidate set for suggesting friends to the user. Thus, a list of candidate friends may be generated independent from use of profile information about a contact, or even a number of communications between contacts. That is, various embodiments of the invention may be used to overcome a dependency upon profile information to enable a user to find their friends, classmates, co-workers, or the like. In one embodiment, candidate friends may be retained within the candidate set or enabled for display if there is a commonality between the friends and the candidate that exceeds the minimum threshold.

In one embodiment, the list of candidate friends may be ranked or ordered for presentation to the user based on a variety of ranking/ordering mechanisms. Thus, in one embodiment, the candidate list may be ordered based on a measure of how many of the user's friends (or friends of friends, or so on) have the candidate in their contact list. Another embodiment of a ranking/ordering mechanism includes a diffusion based approach, in which energy may be determined and diffused based on a number of contacts and contact relationships. Candidates may be determined from the diffusion based approach, in one embodiment, as those contacts having an energy above some value after N iterations (or at equilibrium) over a contact graph.

Yet another embodiment of a ranking/ordering mechanism may include traversal in a weighted graph, wherein edges of a graph of friends may be weighted based on an amount of interactions or communications identified between friends within a modified diffusion based graph. In one embodiment, energy may be distributed over the graph of friends proportional to a strength of a relationship based on a number of interactions. The weighting may also include a memory that modifies the weighting determined from an amount of interactions, based on when the interactions occurred. For example, in one embodiment, where the interactions were identified as occurring a long time ago (e.g., months, years, or the like), these interactions might have a lower weighting than those that occurred more recently (e.g., hours, days, weeks, or the like). The invention is not limited, however, to these weighting schemes, and others may also be employed, without departing from the scope of the invention.

Moreover, post ranking or grouping of candidates may also be achieved, in still another embodiment using tags or other labeling mechanisms. Thus, where a friend has labeled a contact, commonality of labels may be used to group or otherwise organize the candidate list. For example, where a label such as "UC Berkeley" is used by four of the user's friends to label a common friend identified within the candidate list, then that label may be used to identify and/or otherwise group or organize a display of the candidates within the list. Thus, while identifying the candidates is independent of profile information, subsequent ranking, or grouping of the results may employ at least some profile information, if it is available. While at least one embodiment of ranking the candidates might employ communication information, the invention is not constrained to such information. Nor is the invention constrained to employing labels, profile information, or the like, about a contact within contact lists for ordering the resulting candidate friends list.

However, in one embodiment, a user may select an initial set of friends from within their own contact list based on a variety of criteria that would then influence a result. For example, the user might select persons within their own contact list based on being the user's batchmate (e.g., those graduating with the user). Then, embodiments of the invention, independent of profile information, may return candidate friends that are likely to be the user's batchmates.

In one embodiment, an application might reside on a remote server that the user may access to perform the search for friends. However, in another embodiment, the application might reside within at least one user's client computer. In one embodiment, the contact lists might further reside within one or more remote servers, and/or within each user's client computer. In either situation, however, it is expected that each contact, and/or potential contact within a person's contact list has enabled access for at least some searching to locate candidate friends.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-106, Friend Finder Service (FFS) 106, and social services (SS) 108.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as SS 108, FFS 106, or the like. Such user account, for example, may be configured to enable the user to receive emails, send/receive IM messages, SMS messages, access selected web pages, or participate in a social networking activity. However, managing of messages or otherwise participating in other social activities may also be performed without logging into the user account.

Thus, a user of client devices 101-104 may employ any of a variety of client applications to access content, read web pages, receive/send messages, or the like. In one embodiment, for example, the user may employ a browser or other client application to access a web page hosted by SS 108, FFS 106, or the like.

Moreover, client devices 101-104 may employ one or more client applications, such as those described above, to access a contact list. The contact list may include various contacts for which a user of the client device has entered. In at least one embodiment, the contacts may be first degree of separation contact. However, in another embodiment, a user may have entered a contact and/or contact information having not yet communicated with the entered contact. This event might arise based on any of a variety of scenarios. For example, a friend might suggest to the user to communicate with the contact, and provide information about the contact to the user. This could arise, for example, during a potential dating situation, a job opportunity, a referral to a business, a medical professional, or any of the like.

In any event, storage of a contact list associated with a user of a client device may be achieved locally, at the user's client device, and/or remotely at another device, such as SS 108, FFS 106, or the like. In any event, the user may configure their contact list to be searchable by FFS 106 for use in identifying candidate friends.

In one embodiment, client devices 10-104 may employ a remote mechanism, such as might be hosted by SS 108, FFS 106, or the like, for use in obtaining a list of candidate friends, such as is described further below. In another embodiment, the client device may include a client application that is configured and arranged to determine the list of candidate friends. For example, in one embodiment, the client application might be configured to operate similar to a peer-to-peer configuration to query other client devices, and/or other network devices, to access contact lists to generate the candidate friends list. Thus, it should be noted, that embodiments of the invention may be configured to operate on a network device, such as FFS 106, SS 108, or the like, within client devices, and/or a combination of client devices and network devices.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple FFS 106, SS 108, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

SS 108 includes virtually any network computing device that is configured to provide various resources, including content and/or social networking services over network 105. SS 108 may also provide access to any of a variety of content, including, but not limited to messages, such as emails, SMS messages, IM messages, as well as content that may include audio files, video files, text files, streaming files, graphical files, or the like. Thus, virtually any content may be available through SS 108 for access by client devices 101-104. SS 108 might also provide FTP services, APIs, web services, database services, or the like, to enable users to access content. However, SS 108 are not limited to these mechanisms, and/or content, and others are envisaged as well.

In one embodiment, SS 108 might be configured and arranged to provide a website for users to participate in a social networking activity. In one embodiment, participation might include becoming a member to the social networking activity. However, in another embodiment, participation might not require becoming a member.

In one embodiment, SS 108 may be configured and arranged to manage contact lists for one or more of client devices 101-104. In one embodiment, SS 108 may further be configured to enable a user or owner associated with a given contact list to modify content of the contact list, as well as other properties of the contact list. For example, in one embodiment SS 108 may enable a user to enable access to at least a subset of contacts identified within the contact list by another application, user, or the like. Thus, in one embodiment, a user might identify at least a subset of the contacts within their contact list as searchable by an application such as might reside on FFS 106, SS 108, and/or another client device to generate a candidate list of friends. In one embodiment, the user might identify the subset of contacts based on some criteria known to the user about the subset of contacts independent of stored profile information. For example, the user might select the subset based on them being batchmates of the user, or the like.

Devices that may operate as SS 108 include, but are not limited to personal computers, desktop computers, multiprocessor systems, microprocessor-based or programmable consumer electronics, network PCs, servers, network appliances, and the like.

One embodiment of FFS 106 is described in more detail below in conjunction with FIG. 3. Briefly, however, FFS 106 may include any computing device capable of connecting to network 105 to enable a searching of contact lists to generate a list of candidate friends for a user. In one embodiment, a user might employ a user interface provided by FFS 106 to identify a subset of contacts within their contact list as starting friends from which to conduct a friends' search. In one embodiment, the interface may be integrated with an interface associated with a messenger application, browser application, or the like.

FFS 106 may then search contact lists associated with the subset of contacts to identify candidate friends to the requesting user. In one embodiment, the requesting user may specify a level in which the search for candidate friends is to be conducted. For example, the requesting user might specify a degree of separation over which to be searched. In another embodiment, the requesting user might also provide additional constraints on the search, and/or an ordering of a result of the search. For example, in one embodiment, the requesting user might specify a minimum threshold indicating a minimum number of relationships to be identified before including a contact in the list of candidate friends. In another embodiment, the requesting user might further specify other information, such as weighting criteria, or the like, useable to order the results. In any event, FFS 106 may employ a process such as described below in conjunction with FIGS. 4-5 to perform at least some of its actions.

Devices that may operate as FFS 106 include personal computers, desktop computers, multiprocessor systems, microprocessor-based or programmable consumer electronics, network PCs, servers, or the like.

As noted above, the search for a list of candidate friends may also be performed by an application hosted within one or more client devices, similar to a peer-to-peer mechanism. Moreover, where the friend finder application may be hosted within FFS 106, it should be recognized that the application may also reside within SS 108. Moreover, the friend finder application may be distributed across a plurality of network devices, and/or client devices, without departing from the scope of the invention.

Illustrative Client Environment

Figure 2:
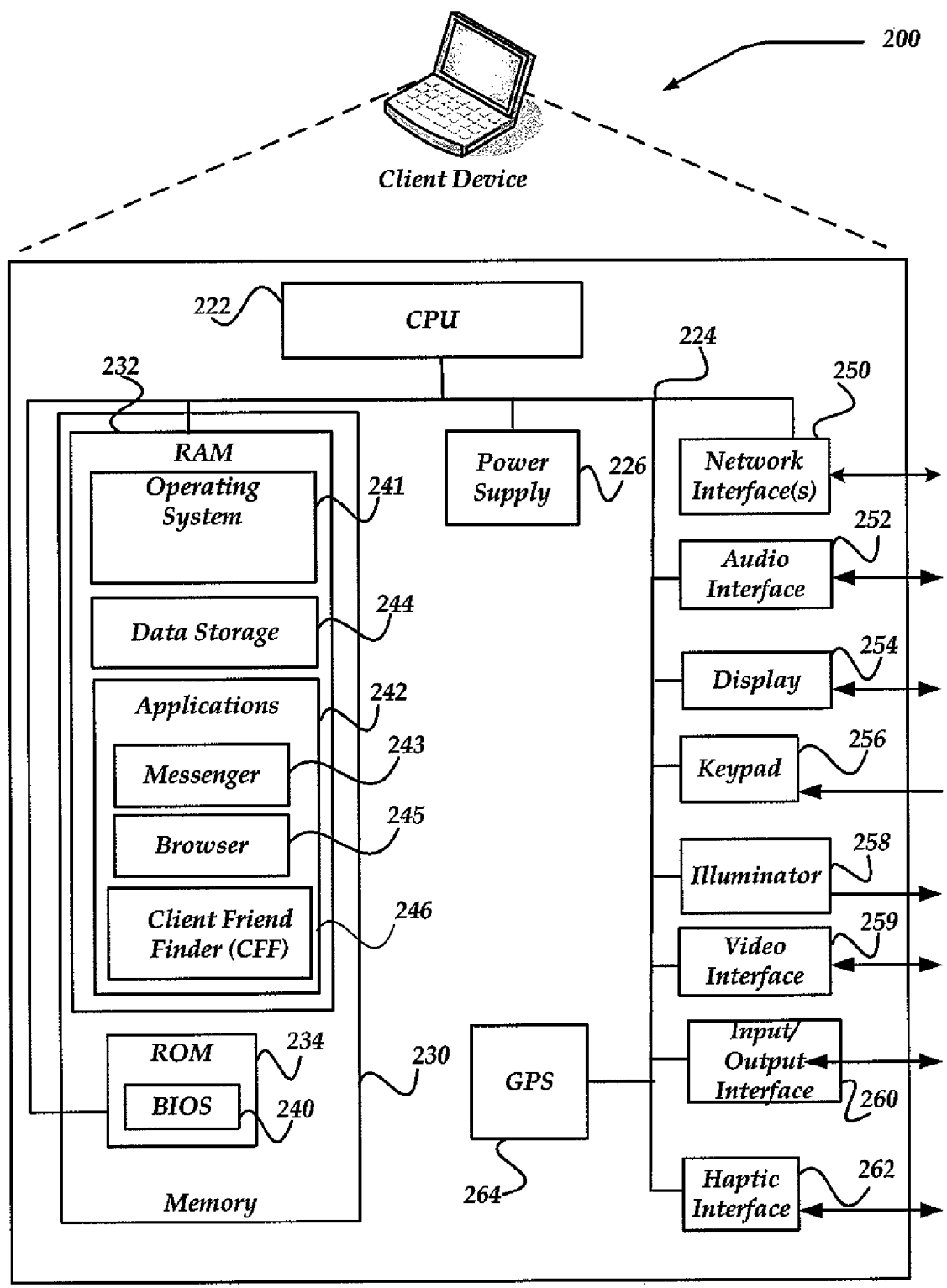
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/ RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 244 may also be employed to store personal information including but not limited to contact lists, personal preferences, data files, graphs, videos, or the like. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and optional client friend finder (CFF) 246.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. In one embodiment, messenger 243 may employ various message boxes to manage and/or store messages.

In either event, a user of client device 200 may employ messenger 243 and/or browser 245 to access a contact list residing, such as might reside in data storage 244, or the like. In one embodiment, messenger 243 and/or browser 245 might also be configured to enable the user to access a contact list that may be associated with the user residing on a remote network device, such as FFS 106 and/or SS 108 of FIG. 1.

CFF 246 represents one embodiment of a client application that may be configured and arranged to enable a user to generate a list of candidate friends based on an analysis of friends' contact lists over a defined degrees of separation. In one embodiment, CFF 246 may provide an interface to the user to enable finding candidate friends that may be integrated with and/or accessed from messenger 243 and/or browser 245. In one embodiment, for example, CFF 246 may operate as a configurable plug-in to messenger 243 and/or browser 245.

In any event, CFF 246 may be configured to enable a user to identify at least a subset of contacts within their contact list from which to commence the search for candidate friends. In one embodiment, CFF 246 may enable the user to identify a plurality of contact lists from which to start the search. For example, the user may be enabled to identify an email contact list, an IM contact list, as well as other contact lists. Thus, the contacts from which a search may be initiated need not be identified within a single contact list associated with the user.

In one embodiment, CFF 246 may also enable the user to provide various constraints, or selections, upon the search and/or a display of a result of the search. Thus, the user might be enabled to identify a number of degrees of separation within which the search is to be performed; a threshold on a minimum number of occurrences of each of the common friends identified within a search, an ordering criteria, a desired tag, and/or label useable for grouping results, or the like. The invention, however, is not limited to these examples, and other selections may also be available to the user, without departing from the scope of the invention.

CFF 246 may then iteratively search each available contact list, starting with those of at least the subset of friends, and continuing over the identified degrees of separation. In one embodiment, the identified degrees of separation may be defaulted to some degree, such as one, two, or the like. However, in another embodiment, the user may provide a degree over which to conduct the search.

CFF 246 may then generate a list of candidate friends (friends of friends) based on the iterative search. CFF 246 may further order and/or group the resulting candidate friends using any of a variety of ranking or ordering mechanisms, including, but not limited to a most common friends of friends, a diffusion based approach (also called an energy propagation approach), and/or a traversal in a weighted graph approach (also called a weighted energy propagation approach). The list of candidate friends may also be organized or grouped based on available tags, labels, or other available profile information. In this embodiment, the profile information is employed on the determined list of candidate friends to organize or otherwise group them, rather than to search for members of the list. Thus, a presence or lack thereof of profile information is not an impediment to at least one embodiment of the invention. CFF 246 may then provide the ordered and/or grouped list of candidate friends for display to a user. The user may then select to automatically include some or all of the candidate friends into the contact list. Moreover, CFF 246 may enable the user to further contact one or more of the friends in the candidate list. In one embodiment, CFF 246 might be configured to hide at least some information about a candidate friend, to enable privacy protections or the like to be implemented. Thus, in one embodiment, an attempt to communicate with a candidate friend might be performed through CFF 246, where, for example, a message might be sent to the candidate friend indicating that a user would like to communicate with the candidate and requesting permission, or performing some other authorization mechanism. CFF 246 may employ processes substantially similar to those described below in conjunction with FIGS. 4-5 to perform at least some of its actions.

As noted, CFF 246 may employ a variety of ordering mechanisms in preparation for providing the candidate list of friends to the requesting user's display. One embodiment of the most common friends of friends ordering mechanism mentioned above operates, in part, for a candidate U in a candidate set measures how many of friends (or friends of friends, and so on) selected by user Y have user U in their friends' list. This mechanism may then provide a most common friend set of candidate friend ordering.

Figure 7:
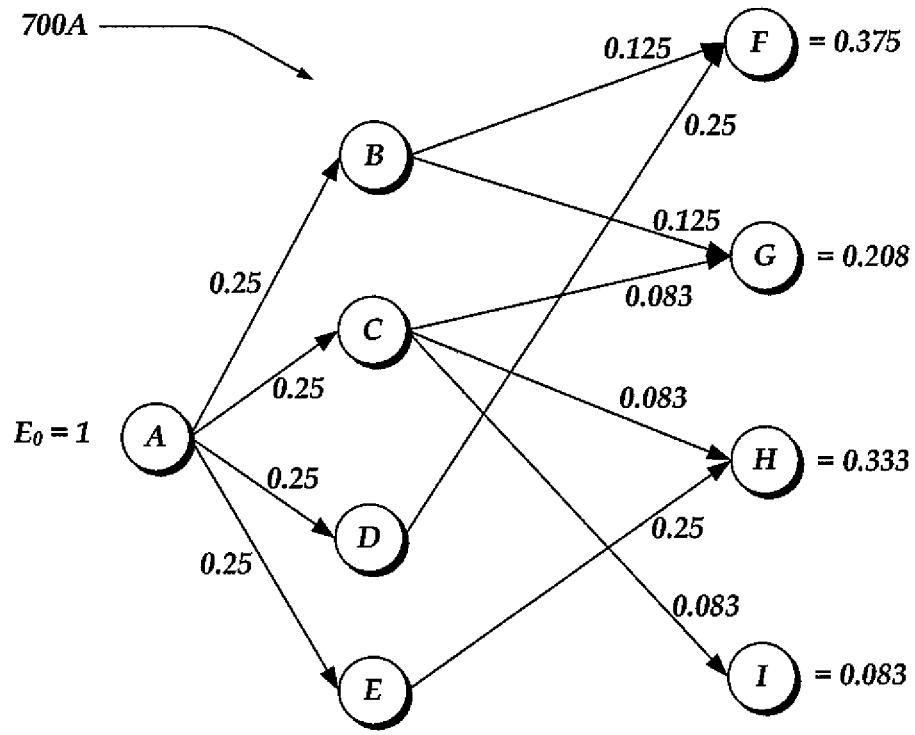
FIG. 7 illustrates non-exhaustive examples of contact graphs useable in embodiment for employing ranking mechanisms of candidate friends.
Figure 7:
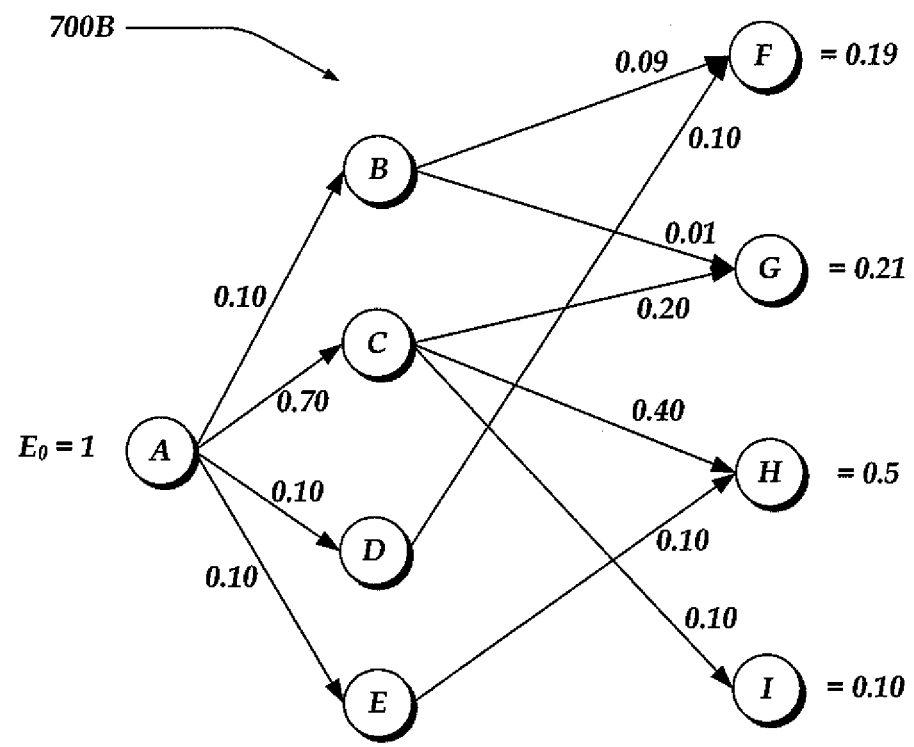

Another ordering mechanism mentioned above is the diffusion based approach (or energy propagation approach) FIG. 7 illustrates non-exhaustive examples of contact graphs useable in embodiment for employing ranking mechanisms of candidate friends. In particular, one embodiment of the diffusion based approach, sometimes called an energy propagation model is illustrated in model 700A of FIG. 7. In one embodiment of the diffusion based approach, friends are organized by user Y can be activated by an initial energy level E, which is then distributed (in one embodiment, equally) to their friends, and so on. The users in the candidate set having a maximum energy after N iterations (or at equilibrium) are suggested to the user Y in an energy order (e.g., descending or ascending energy order).

As an illustrative example, as shown in model 700A of FIG. 7 are contacts A-I. Also shown is a contact list relationship. For example, contact A includes within a contact list, contacts B-E, while contact B includes at least contacts F-G; contact C includes at least H-I; contact D includes at least contact F; and contact E includes at least H. It is clear from above, that contacts B-E may represent all or a subset of contacts from within contact A's contact list, similarly for the other contacts. In one embodiment, the contacts within model 700A may be identified as having an upstream or downstream relationship with respect to another contact. Thus, for example, contact A has a downstream relationship (one degree of separation) with contacts B, C, D, and E. Similarly, B, C, D, and E each have an upstream relationship with contact A. Likewise, contact F has an upstream relationship with contacts B and D; contact F has an upstream relationship with contacts B and C; contact H has an upstream relationship with contacts C and E; and so forth. Thus, to extend this illustration, contact C has a downstream relationship with contacts G, H, and I.

In any event, contact A, which may, in one embodiment, represent the requesting user, may be assigned with an initial energy value. In this example, contact A is assigned a constant value or $E_o=1$. However, other values may also be selected. The energy is then equally distributed to contact A's friends (e.g., contacts B-E). As shown, then contacts B-E each are assigned an energy level of 0.25, for this example. The energy of each contact within model 700A may then be further distributed or propagated. For example, as shown, contact B may then propagate its energy of 0.25 to candidates in the model using an equal distribution. As shown, contact B distributes 0.125 energy to contacts F-G.

The input energy for a contact is then a sum of energy received. For example, as shown in model 700A, the energy of contact E, E(G), would be 0.125+0.083=0.208. Energy propagation stops when the energy received by a user is less than some threshold, in one embodiment. However, in another embodiment, energy propagation may stop based on a degree of separation. For example, energy propagation might be stopped at distance D (to a second degree of separation).

Friends are recommended to the requesting user in an order based on a highest energy contacts have after the propagation is stopped. Thus, in the illustrated example of model 700A, the candidate friends might be ordered as: F(0.375), H(0.333), G(0.208), I(0.083). In one embodiment, as noted elsewhere, a threshold might be used to display the candidates. Thus, in one embodiment, for example, candidates below some threshold, for example 0.1 might not be displayed in the list of candidate friends. In the example model 700A, contact I would then not be displayed to the requesting user. Other modifications may also be used within the diffusion based approach.

Another embodiment of an ordering mechanism is the traversal weighted graph. One embodiment of a model is illustrated as model 700B in FIG. 7. In this mechanism, edges of the friends graph can be weighted by a normalized score of an amount of interactions between users and its friends, or by virtually any other criteria. Then, in one embodiment, the diffusion model can be applied to this graph where the energy is disseminated relative to the strength (edge weights) between users.

Thus, similar to the diffusion based approach, an energy is initially assigned to the initial contact (as shown, contact A). The energy may then be distributed proportional to a weight or strength of relationship of contacts. Thus, for example, in one embodiment, the strength of relationship may be measured by a relative frequency of communications sent by one contact to another contact. For example, in one embodiment, all communications may be used, independent of whether it is an IM communications, email communications, or the like. However, in another embodiment, a subset of communications might be selected, such as IM communications, only, or the like. In this manner, the requesting user might be provided additional capability of selecting friends based on a mode of communications, as well.

In one embodiment, a weight of contact B for contact might be determined as: weight AB=(number of messages from contact A to contact B)/(Total number of messages sent by contact A to all other contacts in model 700B. Thus, weights of an edge of model 700B may be between, 0 to 1, in one embodiment (other values ranges may also be selected). Also, a sum of weights of all edges from a contact A adds up to 1 (or some other value). The energy propagated from contact A to contact B then equals weight AB*E(A), where E(A) represents an energy for contact A.

It should be noted, that other specifications, and variations may also be used. For example, in one embodiment, weighting may be implemented that accounts for when communications last occurred. Thus, older communications might receive lower weights than more recent communications, or the like.

As shown in model 700B, the numbers on the edges (lines) represent the energy transferred through a particular edge.

Let's assume then for this example, that contact A sent 2, 14, 2, and 2 communications to contacts B, C, D, and E, respectively. Then the weights of edges AB, AC, AD, and AE would be 0.1, 0.1, 0.7, and 0.1 respectively. If contact A has an initial energy of 1, for example, this would be propagated to contact B based on weight of edge AB, or 1*0.10=0.10. Other edge energy values are shown for illustration. In any event, then based on the example, contact A would receive a list of candidate friends ordered as: H(0.5), G(0.21), F(0.019), followed by I(0.10). Again, a threshold might be applied that truncates the ordered list.

As noted, CFF 246 of FIG. 2 may also organize the candidate friends based on a label, tag, or the like. Thus, for example, if a contact's profile information within another's contact list provides a tag, label, or the like. These may be weighted, and/or otherwise used to order or group the candidate list. It should be remembered, however that the candidate list is generated independent of profile information and communication frequency information. Such examples of additional information may be used subsequently, as described above, to order the results.

Also, while CFF 246 may reside within a client device and access contact lists from any of a variety of sources, the invention is not so constrained. Thus, in another embodiment, such as described below in conjunction with FIG. 3, an application substantially similar to CFF 246 may operate to perform substantially similar actions to CFF 246 from within a remote network device.

Illustrative Network Device Environment

Figure 3:
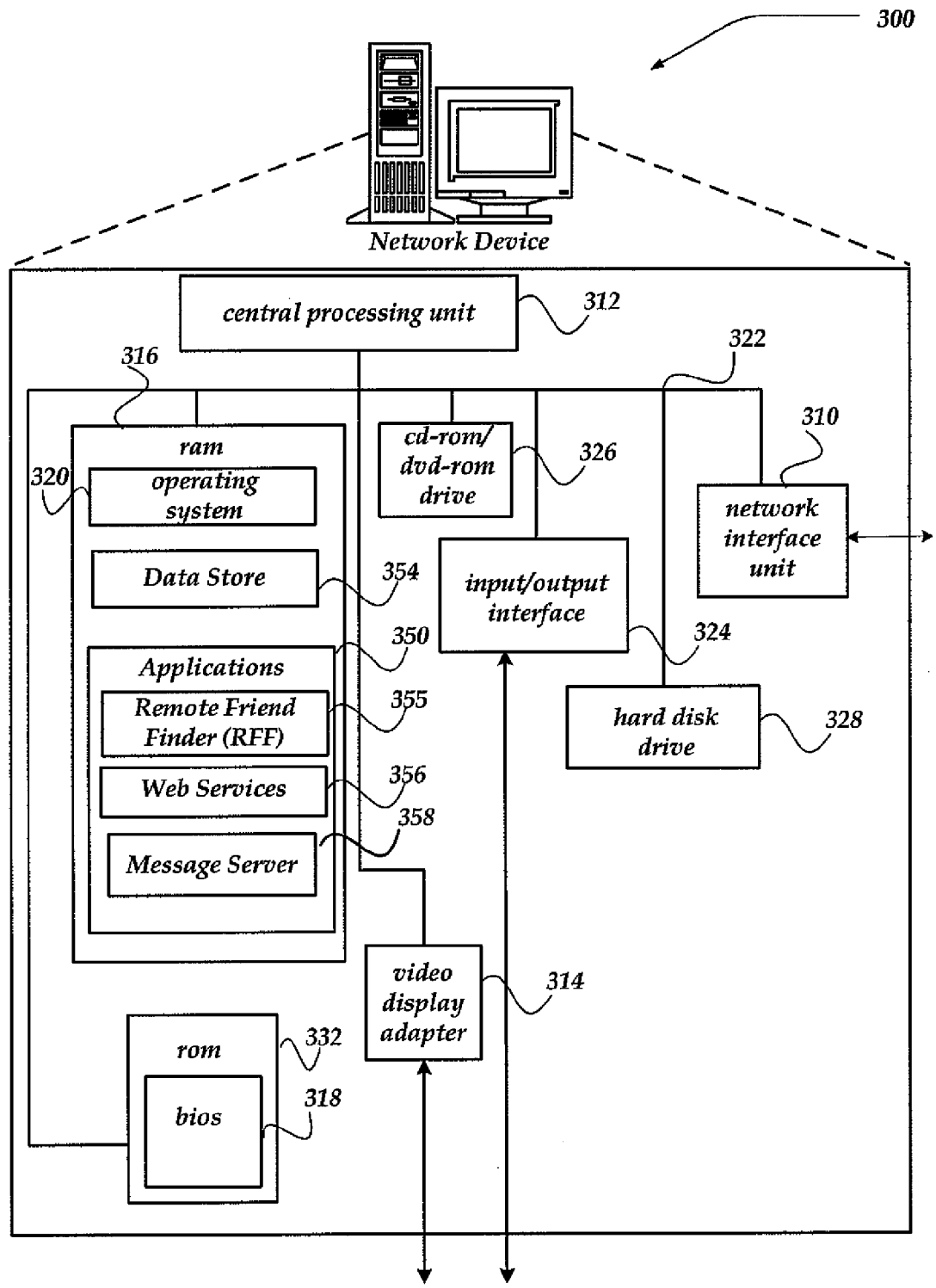
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, FFS 106 and/or SS 108 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include remote friend finder (RFF) 355, web services 356, and Message Server (MS) 358.

Web services 356 represent any of a variety of services that are configured to provide content over a network to another computing device. Thus, web services 356 include for example, a web server, messaging server, a File Transfer Protocol (FTP) server, a database server, a content server, or the like. Web services 356 may provide the content over the network using any of a variety of formats, including, but not limited to WAP, HDML, WML, SMGL, HTML, XML, cHTML, xHTML, or the like. In one embodiment, web services 356 may interact with RSM 355 when a client device requests content.

In one embodiment, web services 356 may be configured to provide social networking site content upon request from a client device. However, the information is not so limited and web services 356 may also be configured to provide a variety of other information, without departing from the scope of the invention. In one embodiment, web services 356 may be configured and arranged to enable a user of a client device to access and otherwise manage communications with another user, manage a contact list, and/or request a search for candidate friends be performed. Thus, in one embodiment, web services 356 may be configured with a plug-in, script, webpage, or the like, that enables a user to also access at least some of the functionality of RFF 355.

Message server 354 may include virtually any computing component or components configured and arranged to forward messages from message user agents, and/or other message servers, or to deliver messages to a local message store, such as data store 354, or the like. Thus, message server 354 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 354 is not constrained to email messages, and other messaging protocols may also be managed by one or more components of message server 354. Thus, message server 354 may also be configured to manage SMS messages, IM, MMS, IRC, mIRC, or any of a variety of other message types.

In one embodiment, message server 354 and/or web services 356 may enable a user to remotely access and manage contact lists stored in data store 354. In one embodiment, message server 354 and/or web services 35 may also enable a user to identify portions or all of the contact lists which may be accessible to others and/or to RFF 355 for use in generating a list of candidate friends for another.

RFF 355 may operate substantially similar to, albeit different from, CFF 246 of FIG. 2. Thus, RFF 355 may enable a plurality of users to generate lists of candidate friends, displayable at the requesting user's display device. RFF 355 may also provide one or more interfaces for use within or in conjunction with message server 354 and/or web services 356 to enable a user to request a search, view a result of the search, and/or request communications with at least one candidate friend within the list of candidate friends. Moreover, RFF 355 may provide one or more interfaces to enable the requesting user modify their contact lists with at least some of the candidate friends within the list of candidate friends. RFF 355 may employ processes substantially similar to those described below in conjunction with FIGS. 4-5 to perform at least some of its actions.

Generalized Operation

Figure 4:
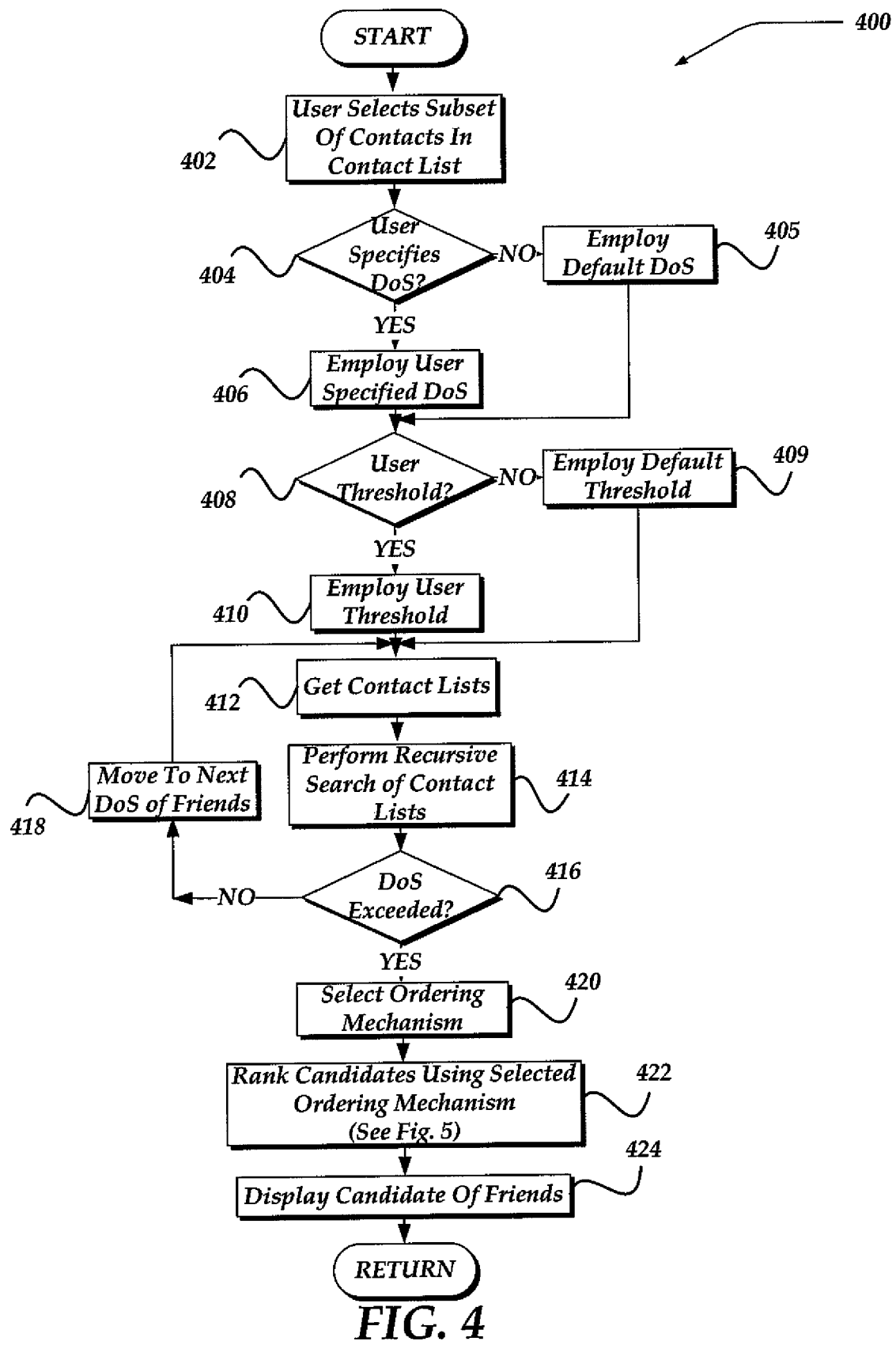
FIG. 4 illustrates a logical flow diagram generally showing one embodiment of a process for identifying candidate friends within friends' contact lists.

The operation of certain aspects of the invention will now be described with respect to FIGS. 4-5. FIG. 4 illustrates a logical flow diagram generally showing one embodiment of a process for identifying candidate friends within friends' contact lists. Process 400 of FIG. 4 may be performed within a client device, such as client devices 101-104, within FFS 106, and/or within SS 108 of FIG. 1.

As shown, process 400 begins, after a start block, at block 402, where a user may request a search be performed to provide a list of candidate friends. The invention is not so limited, however, and the search may be initiated based on any of a variety of conditions, events, or the like. Thus, in one embodiment, where a user of a client device indicates an interest in a social networking group, activity, or the like, such event/condition might automatically trigger the search. Similarly, the search could be triggered on a variety of other conditions, including, but not limited to, an upcoming holiday, a promotion by a social networking group, business or the like. The invention is not limited to these mechanisms for triggering the search, and others are also envisaged.

In any event, in one embodiment, the requesting user might select at least a subset of contacts or friends from within one or more contact lists with which to initiate the search. In one embodiment, all contacts within the user's contact list(s) might be used. In one embodiment, such as where a social networking group initiates the search, an evaluation of the user's contacts might identify a subset contacts. For example, in one embodiment, at least some of the user's contacts might be identified as members of the social network. Thus, these members could also be used as the initial subset of contacts. In one embodiment, the user might select at least the subset of contacts based on one or more criteria. For example, the user might select the subset because the user knows them to be batchmates, poker players, fly fishers, or virtually any other criteria. Such a selection that would be independent of any stored profile information may then influence a result of the search. For example, it may be anticipated that selection of the initial subset based on some criteria will result in finding candidates that also satisfy the 'implied' criteria. The identified subset of contacts may then be provided to the friend finder service.

Processing flows next to decision block 404 where a determination is made whether the user has specified a degree of separation (DoS) over which to conduct the search. In one embodiment, the user might be provided with an interface to enter a value at this juncture. In another embodiment, the user might have configured the search with user preferences prior to, or at virtually any other time. In any event, if the user has specified a DoS, processing flows to block 406, where the user's value is used to establish a range for searching. Otherwise, processing flows to block 405, where a default DoS is employed. In one embodiment, the default value might be 1 or 2, or the like. However, other values may also be established as a default value. In one embodiment, the default value might also be configured as a condition, such that differing DoS are searched until at least a pre-determined number of candidate friends are identified.

In either instance (block 405 or 406) process 400 then moves to decision block 408, where a determination is made whether the user has specified a minimum threshold for inclusion of a candidate friend. If the user has specified a value, processing flows to block 410, where that value is employed; otherwise, processing flows to block 409, where a default threshold value is employed. In one embodiment, the default threshold might also be configured as a condition, so as to enable at least some pre-determined number of candidate friends to be identified, or the like.

After either block 409 or 410, processing continues to block 412, where a first set of contact lists are accessed based on the identified subset of friends (or based on subsequent iterations of process 400). In one embodiment, the contact lists may be specific to contact lists associated with particular communication protocol(s) (IM, SMS, email, or the like). However, in another embodiment, the contact lists might be independent of a communication protocol, such that any available contact lists might be accessed. It is noted, that it is expected that privacy issues, preferences, or the like, might prevent access for searches of a contact's contact list. In one embodiment, a contact might specify that particular contacts within their contact lists are not to be included within a search (or only specified contacts are to be included). Thus, process 400 may be configured to recognize such concerns, and appropriately exclude/include within a search the identified contacts.

Processing flows next to block 414, where a recursive search occurs to identify those friends that are also friends of other friends. One embodiment, of a recursive search is illustrated within FIG. 6.

Figure 6:
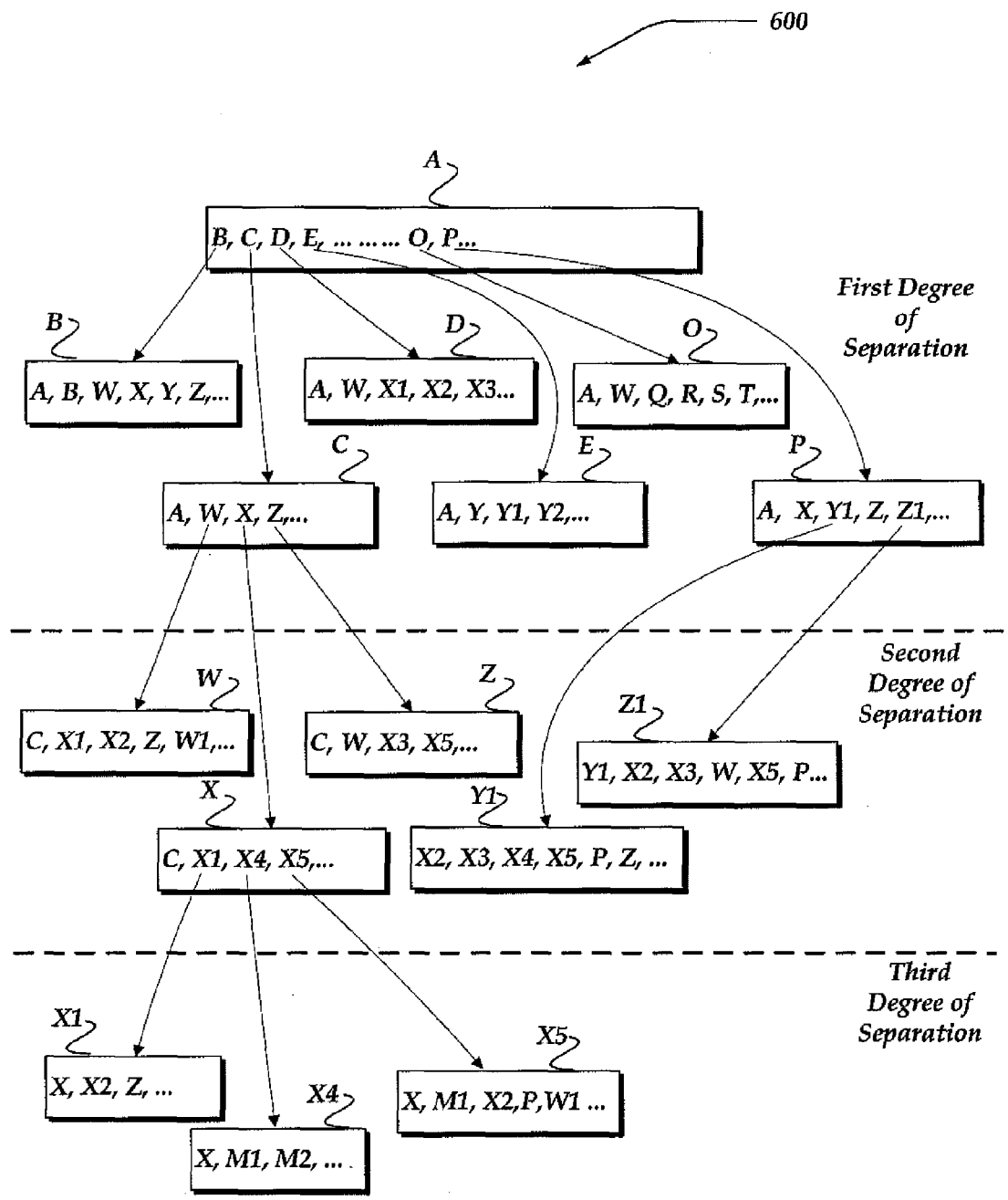
FIG. 6 illustrates a non-exhaustive example of a contact graph based on contact lists useable as one embodiment for identifying candidate friends.

Turning briefly to FIG. 6, a graph 600 structure of contact lists is illustrated. Graph 600 may include many more or less components than those shown in FIG. 6. However, the components shown are sufficient to disclose an illustrative embodiment for practicing the present invention. As shown, graph 600 includes a partial contact list for contacts A, B, C, D, E, O, P, W, X, X1, X4, X5, Y1, Z, and Z1. Contact lists for contacts B, D, O, C, E, and P may be considered to be at a first degree of separation from contact A. Thus, as shown, contacts B, D, O, C, E, and P are identified within contact A's contact list. Similarly, contacts W, Z, Z1, X, and Y1 may be considered to be at a second degree of separation from contact A, as they do not appear within contact A's contact list, but do appear within those contacts within contact A's contact list. Similarly, contacts X1, X4, and X5 represent third degree of separation contacts to contact A. Again, graph 600 merely represents a non-exhaustive example of possible contact relationships based on membership within at least one contact list. Graph 600 therefore, should not be construed as limiting the scope of the invention in any manner, and other structures may also be employed, without departing from the scope of the invention.

As shown, assume contact A represents the requesting user, and has further selected a subset of contact: B, C, D, E, O, and P. At block 414 of FIG. 4, a search is performed upon the contact lists of the subset of contacts to identify common friends. Using the graph 600 of FIG. 6, those contacts having more than one friend in common would then be: W (4), X(3), Y(2), Z(3), and Y1(2, where the number in parenthesis indicates a number of other contacts that contact is found to be in common. Thus, if the process was to conclude at a first DoS, in one embodiment, this might be the list of candidate friends.

Processing continues, however, to decision block 416, where a determination is made whether the identified DoS from block 405 or 406 is exceeded. If not, then processing moves to block 418, wherein the next level of DoS is to be searched is identified. Processing then loops back to blocks 412 and 414 to search the next level. In the example of FIG. 6, then contact lists W, X, Y, Z, Y, and Y1 might be searched. A result of which is incompletely illustrated within FIG. 6. However, for purposes of explanation, it may be seen that contacts X1, X2, X4, and X5 are found to be in common between 2, 2, 3, 2, and 4 other contacts, respectively. If this were where the process 400 was to terminate, then the list of candidate friends might further include at least some of these contacts (based on a threshold setting). Similarly, the process might again loop back and continue until the DoS identified is reached.

If it is determined at decision block 416, that the identified DoS are exceeded, processing flows to block 420, where an ordering mechanism is selected. In one embodiment, the mechanism might include at least any of those described above. In one embodiment, a default ordering mechanism might be identified. Because ordering may, in one embodiment, be an option, in another embodiment, blocks 420 and 422 may be optional.

However, where blocks 420 and 422 are performed, processing flows to block 422 to perform the selected ordering of the list of candidates. One embodiment of block 422 is described in more detail in conjunction with FIG. 5.

Processing then flows to block 424 where the candidate friends may then be displayed to the requesting user. In one embodiment, the requesting user may then add one or more candidate friends to a contact list, and/or attempt to contact one or more of the candidate friends. As noted above, due to privacy reasons, in at least one embodiment, the request to communicate might be sent through an agent, through a friend of the candidate friend, or the like, where at any point, a recipient might select not to respond, respond by refusing to communicate, or perform any of a variety of other actions. Process 400 may then return to a calling process to perform other actions.

Thus, as may be seen from above, the process of identifying candidate friends is performed independent of profile information, a number of communications, or the like, between contacts, thereby providing a higher likelihood that at least one friend of a friend may be identified. Such approach may also be performed more quickly than traditional mechanisms that may require determining profile information, a number of communications, or the like.

Figure 5:
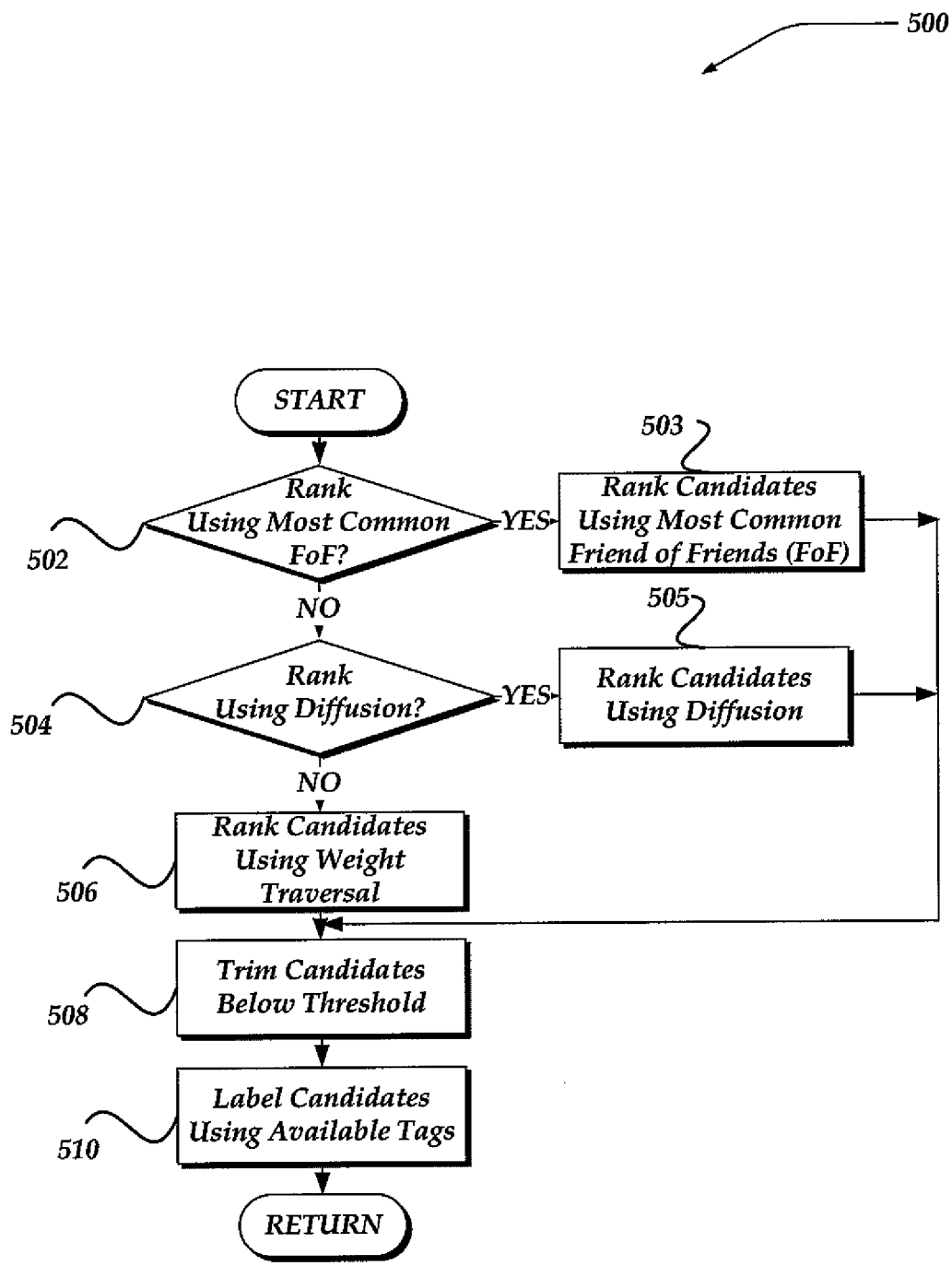
FIG. 5 illustrates a logical flow diagram generally showing one embodiment of a process for ranking for display candidate friends.

FIG. 5 illustrates a logical flow diagram generally showing one embodiment of a process for ranking for display candidate friends. However, the invention is not limited to these mechanisms.

Process 500 of FIG. 5 begins, after a start block, at decision block 502, where a determination is made whether to rank/organize the list of candidate friends obtained through process 400 using a most common friend of friend mechanism. If so, processing flows to block 503; otherwise, processing flows to decision block 504.

At block 503, the list of candidate friends may be ordered based on a most common friend of friends. Thus, using FIG. 6 as an example, candidate friends might be ordered, based on a first DoS search as: W, X, Z, then Y and Y1. Where the numbers are the same (e.g., such as for contacts X and Z), the order may be selected based on other criteria, such as alphabetical, geographic proximity from the requesting user, or the like. Processing then branches to block 508.

At decision block 504, a determination is made whether to rank/organize the list of candidate friends using a diffusion based approach, such as described above. If a diffusion based approach is to be used, processing flows to block 505 to rank using the diffusion approach. Using FIG. 7, graph 700A, a candidate list for that example would be ordered as: F(0.375), H(0.333), G(0.208), and then I(0.083). Processing then branches to block 508.

If at decision block 504, the diffusion based approach is not to be used, then in one embodiment, processing may flow to block 506, where a weighted energy propagation approach is used. Using FIG. 7, graph 700B, a candidate list for that example would be ordered as: H(0.5), G(0.21), F(0.19), then I(0.1). Processing then flows to block 508.

At block 508, the list of ordered candidates may be further trimmed by inhibiting a display of those candidates that fall below the minimum threshold. For example, using FIG. 7, graph 700A, where, for example, the threshold is set to 0.1, then I(0.083) would not be displayed to the requesting user. Similarly, for graph 700B, with the threshold at 0.1, all of contacts H, G, F, and contact I would be displayed to the requesting user.

Processing then may flow to block 510, where if available, tags, labels, or other profile information about a contact within the list of candidate friends, might be useable to further group or organize the candidate friend list. For example, if several of the candidate friends have a tag, or other identifier indicating a same school, employer, or the like, such information might also be useable to group candidate friends. In any event, block 510 may be an optional block that may be used in addition to and/or as a replacement to one of the other sorting approaches described above. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A non-transitory processor readable storage medium that includes data and instructions, wherein the execution of the instructions on a computing device provides for managing social networking relationships over a network by enabling actions, comprising:
   receiving a list of contacts within at least one contact list associated with a requesting user;
   receiving access to a plurality of contact lists, each contact list within the plurality of contact lists being associated with a different contact within the received list of contacts;
   determining a degree of separation over which to perform a search for a list of candidate friends;
   searching within the plurality of contact lists to identify a list of candidate friends wherein each candidate friend is identified as a contact within at least two contact lists within the plurality of contact lists, independent of use of profile information;
   recursively performing the searching of contact lists by replacing contact lists within the plurality of contact lists with contact lists associated with friends within the list of candidate friends and performing the recursive search until the determined degree of separation is exceeded;
   generating a graph from at least a portion of the list of candidate friends which includes each degree of separation for the at least portion of the list of candidate friends and an initial amount of energy that is propagated from the requesting user to each candidate friend at each degree of separation within the graph, wherein each candidate friend at each edge of the graph corresponds to at least a defined threshold of energy;
   ordering the at least portion of the list of candidate friends based on an input energy of each of the candidate friends after the initial amount of energy is propagated through the graph by distributing the initial amount of energy among each downstream relationship of the requesting user; and
   providing, for display, the ordered list of candidate friends to the requesting user.

2. The non-transitory processor readable storage medium of claim 1, wherein propagating the initial amount of energy through the graph results in an equal distribution of friends of a friend within the graph.

3. The non-transitory processor readable medium of claim 1, wherein the execution of the instructions enable actions, further comprising:
   receiving a request from the requesting user to communicate with at least one contact within the ordered list of friends;
   sending an invite to the at least one contact indicating that the requesting user would like to initiate a communication; and
   if the at least on contact indicates a consent, enabling a communication between the requesting user and the at least one contact to proceed.

4. The non-transitory processor readable storage medium of claim 1, wherein the execution of the instructions enable actions, further comprising:
   employing the list of candidate friends to identify another plurality of contact lists, wherein each contact list in the other plurality of contact lists is associated with different friends within the list of candidate friends; and
   searching within the other plurality of contact lists to identify additions to the list of candidate friends wherein each additional candidate friend is identified as a contact in at least two contact lists within the other plurality of contact lists.

5. A method for managing social networking relationships over a network with a network device that performs actions, comprising:
   receiving a list of contacts from within an initial contact list;
   determining a degree of separation over which to perform a search for a list of candidate friends;
   recursively employing the network device for performing the following actions until he determined degree of separation is exceeded:
      searching contact lists, where each contact list is associated with one of the contacts within the list of contacts, to identify the list of candidate friends by adding to the list of candidate friends any contact that is in at least two contact lists, wherein the two contact lists are associated with different contacts within the list of contacts, wherein the searching is performed by the network device;
      accessing contact lists associated with each added contact within the list of candidate friends; and
      updating the list of contacts based on the added contacts to the list of candidate friends; and
   generating a graph from at least a portion of the list of candidate friends which includes each degree of separation for the at least portion of the list of candidate friends and an initial amount of energy that is propagated from a user to each candidate friend at each degree of separation within the graph, wherein each candidate friend at each edge of the graph corresponds to at least a defined threshold of energy, wherein the generating is performed by the network device;
   ordering the at least portion of the list of candidate friends based on an input energy of each of the candidate friends after the initial amount of energy is propagated through the graph by distributing the initial amount of energy among each downstream relationship of the requesting user, wherein the ordering is performed by the network device; and
   displaying the list of candidate friends to the user, such that the user is enabled to seek communications with at least one candidate friend within the list of candidate friends.

6. The method of claim 5, wherein the recursive search is independent of profile information associated with a contact within a contact list.

7. The method of claim 5, further comprising: truncating display of the list of candidate friends by inhibiting display of candidate friends having a value less than the threshold value, wherein the value represents at least a number of friends having the candidate friend in their respective contact lists.

8. A network device to manage a social networking interaction over a network, comprising:
   a transceiver to send and receive data over a network; and
   a processor that is operative to perform actions, comprising:
      receiving a list of contacts from within an initial contact list from a requesting user;
      determining a degree of separation over which to perform a search for a list of candidate friends;

recursively performing the following until the determined degree of separation is exceeded:
    searching contact lists, where each contact list is associated with one of the contacts within the list of contacts, to identify the list of candidate friends by adding to the list of candidate friends any contact that is in at least two contact lists, wherein the two contact lists are associated with different contacts within the list of contacts;
    accessing contact lists associated with each added contact within the list of candidate friends; and
    updating the list of contacts based on the added contacts to the list of candidate friends; and
generating a graph from at least a portion of the list of candidate friends which includes each degree of separation for the at least portion of the list of candidate friends and an initial amount of energy that is propagated from the requesting user to each candidate friend at each degree of separation within the graph, wherein each candidate friend at each edge of the graph corresponds to at least a defined threshold of energy;
ordering the at least portion of the list of candidate friends based on an input energy of each of the candidate friends after the initial amount of energy propagated through the graph by distributing the initial amount of energy among each downstream relationship of the requesting user; and
displaying the list of candidate friends to the requesting user, such that the requesting user is enabled to seek communications with at least one candidate friend within the list of candidate friends.

9. The network device of claim 8, wherein displaying the list of candidate friends further comprises inhibiting display of candidate friends within the list having an associated value less than a threshold.

10. The network device of claim 8, wherein at least one contact list includes at least one contact that is identified as being excluded from the searching.

11. The network device of claim 8, wherein the requesting user is enabled to seek communications further comprises proxying a communication to the at least one candidate friend from the requesting user, such that the requesting user is unable to communicate with the at least one candidate friend directly, until the at least one candidate friend provides authorization.

12. A mobile device for enabling a communications within a social network over a network, comprising:
    a memory arranged to store data and instructions;
    an input interface for receiving requests and sending responses; and
    a processor arranged to execute the stored instructions to enable actions embodied by at least a portion of the stored instructions, the actions comprising:
        receiving a list of contacts from within an initial contact list;
        determining a degree of separation over which to perform a search for a list of candidate friends;
        recursively employing the mobile device for performing the following actions until the determined degree of separation is exceeded:
            searching contact lists, where each contact list is associated with one of the contacts within the list of contacts, to identify the list of candidate friends by adding to the list of candidate fiends any contact that is in at least two contact lists, wherein the two contact lists are associated with different contacts within the list of contacts;
            accessing contact lists associated with each added contact within the list of candidate friends; and
            updating the list of contacts based on the added contacts to the list of candidate friends; and
        generating a graph from at least a portion of the list of candidate friends which includes each degree of separation for the at least portion of the list of candidate friends and an initial amount of energy that is propagated from a user to each candidate friend at each degree of separation within the graph, wherein each candidate friend at each edge of the graph corresponds to at least a defined threshold of energy;
        ordering the at least portion of the list of candidate friends based on an input energy of each of the candidate friends after the initial amount of energy is propagated through the graph by distributing the initial amount of energy among each downstream relationship of the requesting user; and
        displaying the list of candidate friends to the user, such that the user is enabled to seek communications with at least one candidate friend within the list of candidate friends.

13. The mobile device of claim 12, wherein the searching of contact lists further comprises performing the searching of at least one contact list residing on another mobile device.

14. The mobile device of claim 12, wherein ordering the list of candidate friends further comprises employing at least one of a most common friend of friends ordering, a diffusion based ordering, a weighted energy propagation ordering, or an ordering based on available profile information.

15. The mobile device of claim 12, wherein at least two contact lists are associated with a same contact, and wherein the two contact lists is associate with different communication mechanisms.

* * * * *